US009075445B2

(12) United States Patent
Park et al.

(10) Patent No.: US 9,075,445 B2
(45) Date of Patent: Jul. 7, 2015

(54) SYSTEM AND METHOD FOR IMPLEMENTING USER INTERFACE

(71) Applicant: KOREA INSTITUTE OF SCIENCE AND TECHNOLOGY, Seoul (KR)

(72) Inventors: Myoung Soo Park, Seoul (KR); Jung-Min Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 249 days.

(21) Appl. No.: 13/781,860

(22) Filed: Mar. 1, 2013

(65) Prior Publication Data

US 2013/0285898 A1    Oct. 31, 2013

(30) Foreign Application Priority Data

Apr. 25, 2012  (KR) .......................... 10-2012-0042969

(51) Int. Cl.
    *G06F 3/01*           (2006.01)
(52) U.S. Cl.
    CPC ...................................... *G06F 3/017* (2013.01)
(58) Field of Classification Search
    CPC ......... G06F 3/01; G06F 3/017; G06F 3/0488; G06F 3/04886
    USPC .................... 345/156, 157, 173; 178/18.01
    See application file for complete search history.

(56) References Cited

U.S. PATENT DOCUMENTS

| 8,136,053 | B1* | 3/2012 | Miller et al. ................... 715/863 |
| 2009/0003653 | A1* | 1/2009 | Takahata et al. ............... 382/103 |
| 2010/0058252 | A1* | 3/2010 | Ko ................................ 715/863 |
| 2010/0257447 | A1* | 10/2010 | Kim et al. ..................... 715/702 |
| 2012/0086662 | A1* | 4/2012 | Ashikawa ...................... 345/173 |
| 2013/0074014 | A1* | 3/2013 | Ouyang et al. ................ 715/863 |
| 2013/0227418 | A1* | 8/2013 | Sa et al. ........................ 715/728 |
| 2014/0007020 | A1* | 1/2014 | Park et al. ..................... 715/863 |

FOREIGN PATENT DOCUMENTS

KR          100993459  B1 *  11/2010

* cited by examiner

*Primary Examiner* — Joe H Cheng
(74) *Attorney, Agent, or Firm* — NSIP Law

(57) ABSTRACT

A system has an input device for collecting gesture information of a user, a computing device for processing the gesture information collected by the input device, a memory for storing information of executive trajectories for executing various functions, and an output device for displaying the information processed by the computing device, wherein each executive trajectory is defined as an executive input for each function, if a gesture performed by the user completes one of the executive trajectories, a function corresponding to the corresponding executive trajectory is executed, wherein, if the user starts a gesture, the computing device compares a path of a trajectory of a gesture performed by the user with start paths of the executive trajectories and selects candidate trajectories having similarity higher than a preset criterion, and wherein the candidate trajectories are displayed by the output device to suggest path information of the candidate trajectories to the user.

13 Claims, 14 Drawing Sheets

SYSTEM AND METHOD FOR IMPLEMENTING USER INTERFACE

CROSS-REFERENCE TO RELATED APPLICATION

This application claims priority to Korean Patent Application No. 10-2012-0042969, filed on Apr. 25, 2012, and all the benefits accruing therefrom under 35 U.S.C. §119, the contents of which in its entirety are herein incorporated by reference.

BACKGROUND

1. Field

The present disclosure relates to a system and method for implementing a user interface, and more particularly, to a system and method for implementing a user interface, which may set an input method for performing various function in various ways and allow a user to intuitively perceive the defined input method.

2. Description of the Related Art

As portable electronic computer devices such as smart phones come into wide use, functions provided by such devices are being diversified. Due to such diversified functions, input methods for performing such functions also need to be more diversified. Accordingly, there is needed a user interface for allowing a user to intuitively perceive various input methods without memorizing them one by one.

In order to intuitively perceive inputs, at a user interface using a touch screen, an input method for executing a function has been proposed that user performs a predefined gesture corresponding to a function.

As an exemplary conventional technique of input methods, a moving body which may be touched and moved by a user is graphically displayed on a screen along with a path representing a direction along which the moving body should be moved. For example, if the user moves the moving body along the displayed path, the electronic device is unlocked.

However, in the above conventional technique, the provided gesture is very simple and limited, and so it is difficult to execute various functions by using various gestures.

Electronic devices are expected to be developed to perform more functions. Therefore, it is needed to suggest an input method capable of executing more diversified functions to catch up with this trend. In addition, it is required to give convenience to a user using an electronic device by allowing the user to intuitively perceive executive inputs for performing various functions without memorizing them one by one.

SUMMARY

The present disclosure is directed to providing a system and method for implementing a user interface, which may enhance diversity of input methods by endowing trajectories of various patterns as executive inputs for various functions of an electronic device, and may allow the user to intuitively perform a gesture according to a trajectory without memorizing trajectories one by one by showing a gesture path relating to a function to be performed by the user in advance when the user makes a gesture for performing the function.

In one aspect, there is provided a system for implementing a user interface, which includes: an input device for collecting gesture information of a user; a computing device for processing the gesture information collected by the input device; a memory for storing information of executive trajectories for executing various functions; and an output device for displaying the information processed by the computing device, wherein each executive trajectory is defined as an executive input for each function, so that, if a trajectory of a gesture performed by the user completes one of the executive trajectories, a function corresponding to the corresponding executive trajectory is executed, wherein, if the user starts a gesture, the computing device compares a path of a trajectory of a gesture performed by the user with start paths of the executive trajectories and selects candidate trajectories having similarity higher than a preset criterion, and wherein the selected candidate trajectories are displayed by the output device to suggest path information of the candidate trajectories to the user.

According to an embodiment, the information of the executive trajectories may include information about a start point, a path and an end point, the executive trajectories may be classified into trajectory groups, each having trajectories with the same start point, and, in the case a start location of a trajectory of a gesture performed by the user corresponds to the start point, the candidate trajectories may be selected in a trajectory group having the start point.

In addition, start points of the trajectory groups may be respectively designated according to a plurality of functional regions output from the output device.

In addition, the computing device may determine current location information of an input device by which the user inputs a gesture, and path information after the start paths of the candidate trajectories to be performed by the user may be suggested based on the current location of the input device.

In addition, path information after the start path may be a part of the candidate trajectories.

In addition, the executive trajectories may include a common trajectory, and the common trajectory may be not displayed by the output device.

In addition, the input device may collect 3-dimensional gesture information of a user, the output device may display a 3-dimensional virtual space set by the computing device, and the executive trajectories may be 3-dimensional trajectories expressible in the virtual space.

In another aspect of the present disclosure, there is provided a method for implementing a user interface, which includes: storing information of executive trajectories for executing various functions; defining each executive trajectory as an executive input of each function; collecting gesture information of a user by using an input device; calculating similarity by comparing a path of a trajectory of a gesture of the user with each start path of the executive trajectories, when the user starts a gesture; selecting candidate trajectories with similarity higher than a preset criterion; suggesting path information of the candidate trajectories to the user by displaying the selected candidate trajectories by an output device; and when a trajectory of a gesture performed by the user completes one of the executive trajectories, executing a function corresponding to the completed trajectory.

According to an embodiment, the method may further include: forming the information of the executive trajectories by using information about a start point, a path and an end point; and classifying the executive trajectories into trajectory groups, each having executive trajectories with the same start point, wherein, in the case a start location of a trajectory of a gesture performed by the user corresponds to the start point, the candidate trajectories may be selected in a trajectory group having the start point.

In addition, the method may further include designating start points of the trajectory groups respectively according to functional regions display by the output device.

In addition, the method may further include determining current location information of an input device by which the user inputs a gesture, wherein path information after the start path of the candidate trajectories to be performed by the user may suggested based on the current location of the input device. Path information after the start path may be a part of the candidate trajectories.

In addition, the method may further include selecting a common trajectory of the executive trajectories, wherein the common trajectory may be not displayed by the output device.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1A:
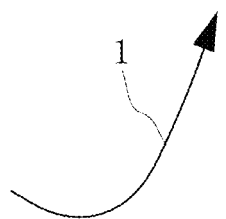
FIGS. 1A to 1E are diagrams exemplarily showing executive trajectories.
Figure 1B:
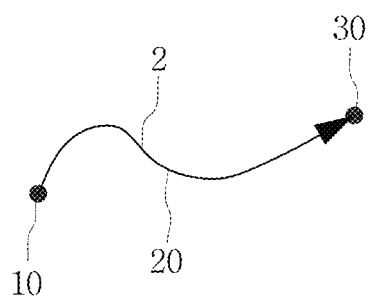
Figure 1C:
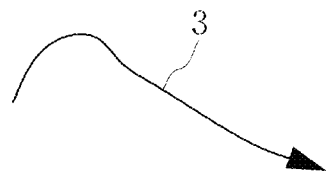
Figure 1D:
Figure 1E:
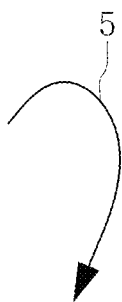

Hereinafter, an embodiment of the present disclosure will be described with reference to the accompanying drawings. Though the present disclosure is described with reference to the embodiments depicted in the drawings, the embodiments are just examples, and the spirit of the present disclosure and its essential configurations and operations are not limited thereto.

A user interface system according to an embodiment of the present disclosure includes an input device for collecting gesture information of a user, a computing device for processing the gesture information collected by the input device, a memory for storing information of executive trajectories for executing various functions, and an output device for displaying the information processed by the computing device.

Figure 3:
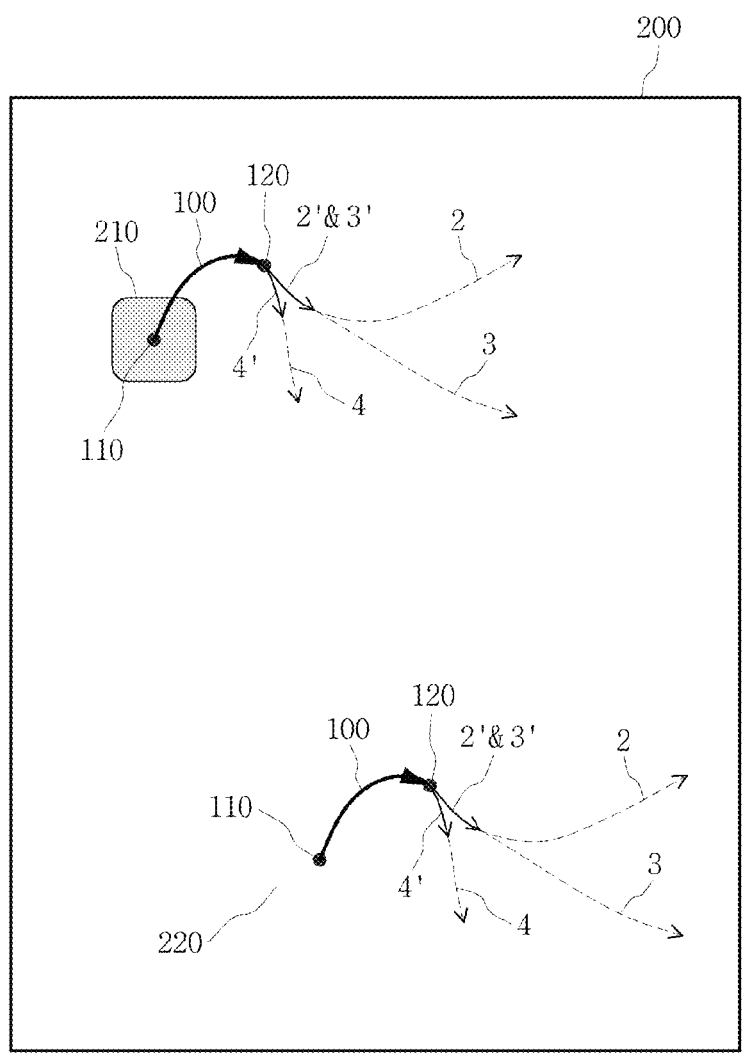
FIG. 3 is a diagram for illustrating a process of performing a function by a gesture in a user interface system according to another embodiment of the present disclosure.

The user interface system of this embodiment is applied to an electronic device having a touch screen 200 (FIG. 3). The touch screen 200 for receiving gesture information by the touch of a user and displaying various information is an input and output device of this system. The gesture information of the user may be input by the hand of the user as well as various input devices for example a stylus.

In addition, even though it is described in this embodiment that the touch screen is used as an input and output device, the present disclosure is not limited thereto. For example, a screen may be provided as an output device, and a camera or sensor capable of collecting gesture information of a user may be separately used as an input device. The camera or sensor collects gesture information by detecting a gesture of the user in a state where the user does not touch the screen by the hand or the stylus.

According to the present disclosure, various executive trajectories are defined as an executive input for each of a plurality of function loaded in the system.

FIGS. 1A to 1E are diagrams exemplarily showing executive trajectories according to this embodiment.

The memory stores executive trajectories 1 to 5 as shown in FIGS. 1A to 1E. The executive trajectories 1 to 5 may be stored in the memory in advance by a system designer or may be directly input and stored by a user.

Each of executive trajectories 1 to 5 corresponds to an executive input for a specific function. For example, the executive trajectory 2 corresponds to an executive input for executing a "contents deleting" function. The executive trajectory 3 corresponds to an executive input for executing a "contents copying" function. And, the executive trajectory 4 corresponds to an executive input for executing a "contents pasting" function. The executive trajectory 1 and the executive trajectory 5 are also endowed with inherent functions.

A function corresponding to the executive trajectory is executed if a trajectory of a gesture performed by the user at the touch screen completes one of the executive trajectories 1 to 5. For example, the "contents deleting" function is executed if the user touches the touch screen 200 and completes a gesture substantially identical to the executive trajectory 2.

In this embodiment, the executive trajectories 1 to 5 are composed of information about a start point 10, a path 20 having intermediate points, and an end point 30. However, in this embodiment, the start point 10 is just a criterion point of a start path explained later but has no relation with a start point of a trajectory of a gesture performed by the user.

Therefore, regardless of a point of the touch screen 200 where the user starts a gesture, if the gesture makes the same trajectory, a function corresponding to the trajectory made by the gesture is executed.

Since the executive trajectories 1 to 5 have a very high degree of freedom, it is difficult for the user to memorize the executive trajectories 1 to 5 one by one and perform a gesture corresponding to each executive trajectory.

Therefore, in this embodiment, among the executive trajectories 1 to 5, an executive trajectory for executing a desired function is fed back so as to be checked by the user by the naked eyes.

FIGS. 2A to 2D are diagrams for illustrating the concept of feeding back an executive trajectory to the user.

As described above, the executive trajectories 2, 3, 4 are entirely corresponding to executive inputs relating to contents processing such as contents deleting, contents copying or contents pasting. The executive trajectories 2, 3, 4 have a common feature since their start paths are rounded from the bottom to the top. Here, the "start path" means a part of a trajectory extending from the start point of the trajectory along the path.

Therefore, in this embodiment, the user may memorize only the fact that the executive trajectory for executing a function relating to contents processing has a start path rounded from the bottom to the top, without memorizing shapes of all executive trajectories 2, 3, 4.

Figure 2A:
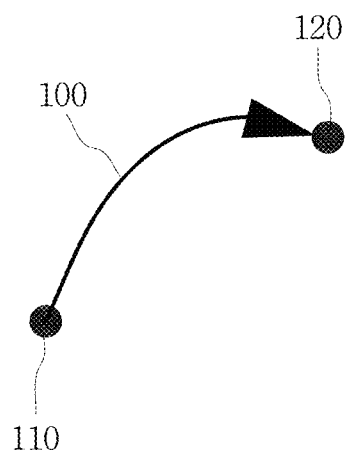
FIGS. 2A to 2D are diagrams for illustrating a process of performing a function by a gesture in a user interface system according to an embodiment of the present disclosure.

In detail, as shown in FIG. 2A, the user touches the touch screen 200 by the hand and takes a gesture by moving the hand from the start point along a path rounded upwards. At this time, the reference symbol 110 represents a start point of the hand, and the reference symbol 120 represents a current point of the hand.

If the user starts a gesture, the computing device calculates a location of the hand after a given time. The computing device then obtains a trajectory of a gesture 100 formed from the start point 110 of the gesture to the current point 120. After that, the computing device compares a path of the obtained trajectory of a gesture 100 with start paths of the executive trajectories 1 to 5 stored in the memory to check similarity between them.

The process of comparing the path of a trajectory of a gesture 100 with the start paths of the executive trajectories 1 to 5 stored in the memory to check similarity between them is as follows.

1) First, a path of a trajectory of a gesture taken by the user is called P, and paths of executive trajectories to be compared with the above path are respectively called $P_1, P_2, \ldots, P_N$. In the case a single subject moves via multiple locations in the space during a certain time, a trajectory is obtained by recording the locations together with their time. If the locations are recorded just in order and accurate are not recorded, a row of the locations is called a path.

2) In order to check similarity between start path of trajectories and a path of a trajectory of a gesture taken by the user, a similarity criterion of individual locations is defined in advance. After calculating a Euclidian distance d (x, y) of two locations x and y, if the value is not greater than t, two locations are regarded as having similarity.

3) By using the above criterion, a path having a start point at a location similar to the start point of the path of a trajectory of a gesture is selected. Assuming that the start point 110 of P is $P_{start}$ and start points of paths $P_1, P_2, \ldots, P_N$ of trajectories are $P_{1,start}, P_{2,start}, \ldots, P_{N,start}$, corresponding paths of k where d $(P_{k,start}, P_{start})$<t are selected and called $P_1', P_2', \ldots, P_M'$.

4) Among points on $P_1', P_2', \ldots, P_M'$, points at locations similar to $P_{end}$, namely a current point 120 of P, are found according to the criterion proposed in Process 2) above. Partial paths from start points of $P_1', P_2', \ldots, P_M'$ to points at locations similar to $P_{end}$ are stored. If many points are found at locations similar to the current point of P in one of the paths $P_1', P_2', \ldots, P_M'$, a partial path is separately stored for each point. Such partial paths are called $P_{11}', P_{12}', \ldots, P_{1N_1}', P_{21}', P_{22}', \ldots, P_{2N_2}', \ldots, P_{M,N_M}'$.

5) Points corresponding to each other are found between P and $P_{11}', P_{12}', \ldots, P_{1N_1}', P_{21}', P_{22}', \ldots, P_{2N_2}', \ldots, P_{M,N_M}'$. In detail, when the length of P is L and intermediate points $p^1, p^2, \ldots, p^k$ except for the start point and the current point are placed at points with lengths of $a_1 L, a_2 L, \ldots, a_k L$ ($0<a_k<1$, k=1, 2, ..., K) from the start point along the path of P, a corresponding point is found in $P_{11}', P_{12}', \ldots, P_{1N_1}', P_{21}', P_{22}', \ldots, P_{2N_2}', \ldots, P_{M,N_M}'$, and if there is no point at the corresponding location, a corresponding point is obtained by performing interpolation to the path. For example, in the case the length of $P_{11}'$ is $L_{11}$ and the intermediate points $p_{11}^1, p_{11}^2, \ldots, p_{11}^k$ thereon are respectively placed at points with lengths of $b_1 L_{11}, b_2 L_{11}, \ldots, b_L L_{11}$ ($0<b_j<1$, j=1, 2, ..., L) from the start point along the path, a corresponding point of the point $p^3$ on P is found as follows. First, one having the same value as $a_3$ is found from $b_1, b_2, \ldots, b_L$, and if there is an intermediate point corresponding to $P_{11}'$, the point is selected as a corresponding point of $p^3$. If none of $b_1, b_2, \ldots b_L$, has the same value as $a_3$, a greatest value $b_5$ among values smaller than $a_3$ is found and a smallest value $b_6$ among values greater than $a_3$ are found from $b_1, b_2, \ldots, b_L$, and then $q_{11}^3$ is obtained by performing interpolation according to Equation 1 below by using intermediate points $p_{11}^5$ and $p_{11}^6$ on $P_{11}'$ corresponding thereto and selected as a corresponding point of $p^3$.

$$q^3 = \frac{(b_6 - a_3)p_{11}^5 + (a_3 - b_5)p_{11}^6}{(b_6 - a_3) + (a_3 - b_5)} \quad \text{Equation 1}$$

6) If corresponding points between the partial paths and the path of user's gesture are obtained, Euclidian distances between the corresponding points are obtained and entirely added up so that its reciprocal number is used as similarity of each partial path. However, in Processes 3) and 4) above, similarity of paths of unselected trajectories is defined as 0.

7) A trajectories are selected in sequential order from a trajectory having greatest similarity as candidate trajectories conforming to a trajectory of a gesture.

According to the above processes, the computing device selects a trajectory of a gesture 100 and candidate trajectories whose start paths have similarity higher than a predetermined value, from the executive trajectories 1 to 5. The criterion for the candidate trajectories may be preset as, for example, 90%, and it would be understood that the criterion may be suitably adjusted in consideration of similarity among the candidate trajectories.

In this embodiment, since the user takes a gesture with the intention of processing contents, the executive trajectory 2 ("contents deleting"), the executive trajectory 3 ("contents copying") and the executive trajectory 4 ("contents pasting") will be selected as candidate trajectories.

Figure 2B:
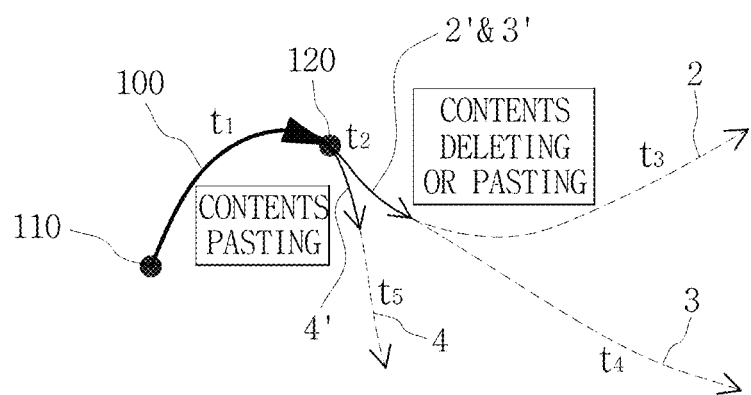

As shown in FIG. 2B, a part of the selected candidate trajectories is displayed on the touch screen 200 to notify path information about a direction in which the user should move the hand from the current location 120.

Referring to FIG. 2B, trajectory 2' & 3' which is common trajectory of the executive trajectory 2 and the executive trajectory 3 based on the present location 120 and a trajectory 4' which is a part of the executive trajectory 4 are displayed on the screen. The common trajectory 2' & 3' of the executive trajectory 2 and the executive trajectory 3 substantially have the same path in the executive trajectory 2 and the executive trajectory 3.

In FIG. 2B, a trajectory of gesture 100 and dotted arrows depicting all executive trajectories 2, 3, 4 are not displayed on the actual screen. In other words, on the screen, there are displayed only the trajectory 2' & 3' which is common trajectory of the executive trajectory 2 and the executive trajectory 3 based on the current point 120 of the hand and the trajectory 4' which is a part of the executive trajectory 4.

By displaying the trajectory 2' & 3' which is common trajectory of the executive trajectory 3 and the partial trajectory 4' of the executive trajectory 4 on the screen as described above, the number of candidate trajectories displayed on the screen may be minimized so that the user may check the candidate trajectories at a glance. However, the present disclosure is not limited thereto, and all executive trajectories 2, 3, 4 may also be displayed on the screen, as obvious to those skilled in the art.

Meanwhile, in this embodiment, a function performed when the executive trajectories 2, 3, 4 are completed at the sides of the trajectory 2' & 3' which is common trajectory of the trajectory 3 and the partial trajectory 4' which is a part of the trajectory 4 may be displayed in a pop-up window. A pop-up window recording "contents deleting or copying" relating to a function by the executive trajectory 2 and the executive trajectory 3 is output at the side of the trajectory 2' & 3'. A pop-up window recording "contents pasting" relating to a function by the trajectory 4 is output at the side of the trajectory 4'. By this, the user may intuitively perceive that one of two functions "contents deleting" and "contents copying" may be executed by performing a gesture along paths suggested by the trajectory 2' & 3'. The user may also intuitively perceive that the "contents pasting" function may be executed by performing a gesture along the path suggested by the trajectory 4'.

If the user wants the "contents deleting" function, the user moves the hand along the trajectory 2' & 3'. If the hand of the user reaches the current location 120 of FIG. 2C, namely the end point of the trajectory 2' & 3', the computing device checks similarity between a trajectory of a gesture 100 of FIG. 2C and the executive trajectories 1 to 5. At this time, the computing device may check similarity between a trajectory of a gesture 100 of FIG. 2C and all executive trajectories 1 to 5. However, in this embodiment, the computing device checks similarity between a trajectory of a gesture 100 of FIG. 2C and only preceding paths of the candidate trajectories 2, 3, 4 selected by the preceding process and selects a candidate trajectory again from the candidate trajectories 2, 3, 4.

Figure 2C:
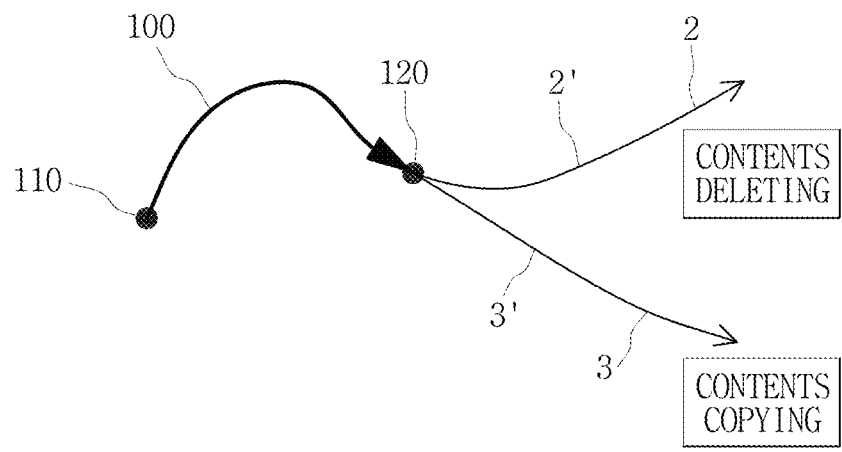
Figure 2D:
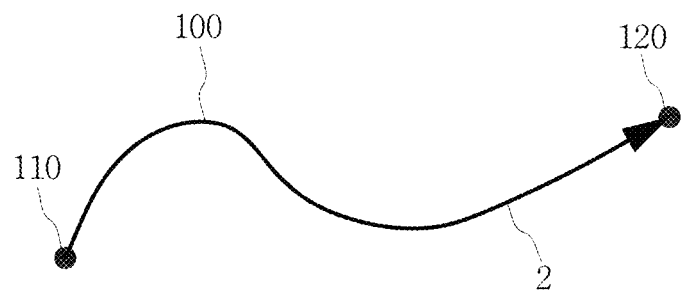

In FIG. 2C, as the user moves the hand along the trajectory 2' & 3', the executive trajectory 4 having low similarity with a trajectory of a gesture 100 drops out from the candidate trajectories 2, 3, 4. Remaining portions 2' and 3' of two remaining candidate trajectories 2 and 3 are displayed on the screen, and a pop-up window recording each corresponding function are displayed at the side of each trajectory. If the user wants to perform the "contents deleting" function, the user moves the hand and completes the executive trajectory 2 as shown in FIG. 2D. And then, the "contents deleting" function is executed.

According to the above configuration, in order to execute the "contents deleting" function, the user may not memorize the shape of the executive trajectory 2 exactly. In other words, the user may memorize only the fact that a gesture relating to contents processing starts with a path (see FIG. 2A) rounded from the bottom to the top. In this case, if the user starts the corresponding gesture, the computing device selects executive trajectories 2, 3, 4 relating to contents processing by checking similarity and then guides the user to move the hand to a certain location by displaying a part of the trajectory on the screen. Therefore, the user may intuitively execute a desired function without memorizing all the diversified executive trajectories.

Meanwhile, in this embodiment, the computing device records demonstration time to complete to complete the executive trajectories and accuracy of the trajectories by the user in memory, and selects an executive trajectory completed in short demonstration time and having high accuracy as a "common trajectory" which is frequently used by the user.

The selected common trajectory is excluded from the candidate trajectories and not displayed on the screen. In other words, executive trajectories already known by the user and frequently used are not displayed. Since path information which is already known by the user and does not need to be notified is not provided again, the interface may have a simple configuration.

Meanwhile, according to another embodiment of the present disclosure, the executive trajectories may be classified into a few trajectory groups, each having the same start point, as shown in FIG. 3.

In detail, the user may form five trajectories 1 to 5 shown in FIGS. 1A to 1E as a group subordinate to a specific start point.

Referring to FIG. 3, the touch screen 200 has a functional region for executing application, which is displayed as an icon 210 for executing a specific application.

The user may subordinate start points of the executive trajectories 1 to 5 to the functional region for executing application (namely, the icon 210) and endow functions for executing corresponding applications to the trajectories 1 to 5. For example, the executive trajectory 2 is endowed with an executive input for an "application executing" function, the executive trajectory 3 is endowed with an executive input for an "application exit" function, and the executive trajectory 4 is endowed with an executive input for an "application deleting" function.

If the user touches the icon 210 by the hand and performs a gesture, since the user has an intention of performing a function relating to application executing, candidate trajectories are selected from the group of the executive trajectories 1 to 5 corresponding to a function-executing input for the application.

As shown in the upper part of FIG. 3, if the user touches the icon 210 by the hand and performs a trajectory of a gesture 100, the executive trajectory 2 relating to "application executing", the executive trajectory 3 relating to "application exit" and the executive trajectory 4 relating to "application deleting" are selected as candidate trajectories, and the trajectory 2' & 3' and the trajectory 4' are displayed on the screen.

Similar to the embodiment described above, the user may execute an application by performing a gesture according to the executive trajectory 2.

Meanwhile, the touch screen 200 may have a contents-displaying functional region for displaying various kinds of contents together with or separately from the functional region for executing application.

The user may also subordinate the start points of the executive trajectories 1 to 5 of FIGS. 1A to 1E to the contents-displaying functional region 220, and endow the executive trajectories 1 to 5 with functions (contents copying, deleting or the like) relating to contents processing.

If the user touches the contents-displaying functional region 220 by the hand and performs a gesture, since the user has an intention of performing a function relating to contents processing, candidate trajectories are selected from the group of the executive trajectories 1 to 5 relating to the contents processing.

As shown in the lower part of FIG. 3, if the user touches the contents-displaying functional region 220 by the hand and performs a trajectory of a gesture 100, the executive trajectory 2 relating to "contents deleting", the executive trajectory 3 relating to "contents copying" and the executive trajectory 4 relating to "contents pasting" are selected as candidate trajectories, and the trajectory 2' & 3' and the trajectory 4' are displayed on the screen.

Here, the executive trajectories 1 to 5 belonging to the trajectory group having start points subordinate to the contents-displaying functional region 220 have the same path shape as the executive trajectories 1 to 5 belonging to the trajectory group subordinate to the functional region for executing application described above. Both trajectory groups are just different from each other in the fact that their start points are subordinate to different regions.

In other words, even though executive trajectories have the same shape, they may be defined as executive inputs for executing entirely different functions if different start points are endowed thereto.

If the above features are used, the user may perform various functions by using just several trajectories so that executive trajectories quite accustomed by the user and having relatively simple paths are commonly used in various functional regions in a state where only their functions are defined differently.

Meanwhile, even though the former embodiment has been described in relation to the user interface system using 2-dimensional trajectories, it should be understood that the user interface system according to the present disclosure may also be desirably applied to a 3-dimensional user interface system.

Figure 4:
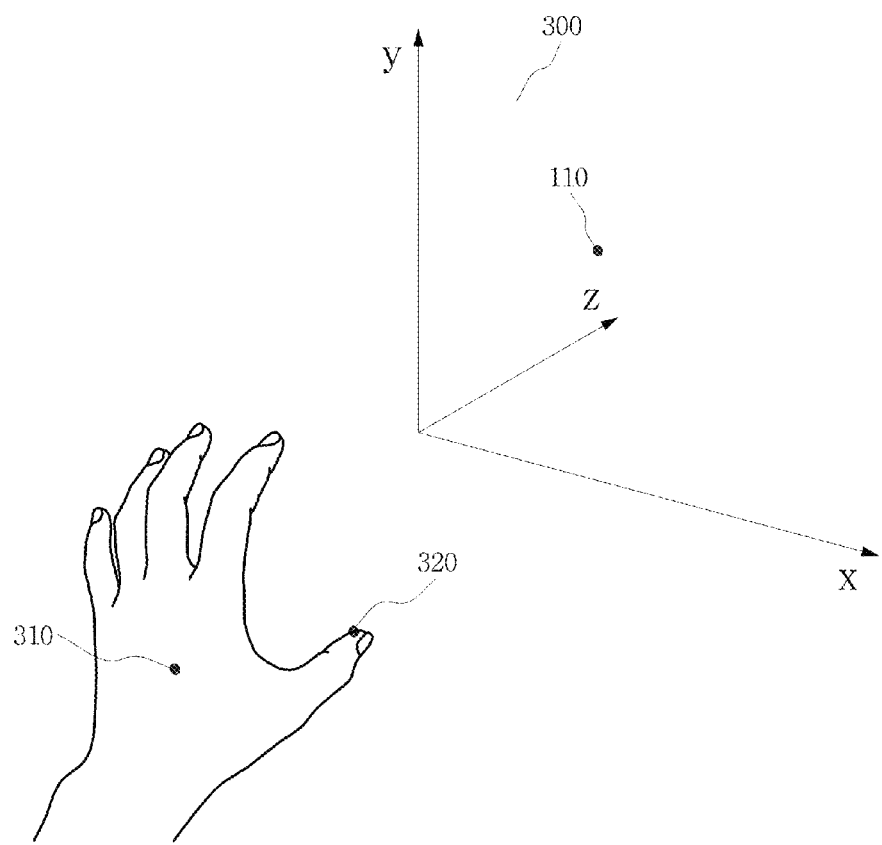
FIGS. 4 and 5 are diagrams for illustrating a process of performing a function by a gesture in a user interface system according to further another embodiment of the present disclosure.
Figure 5:
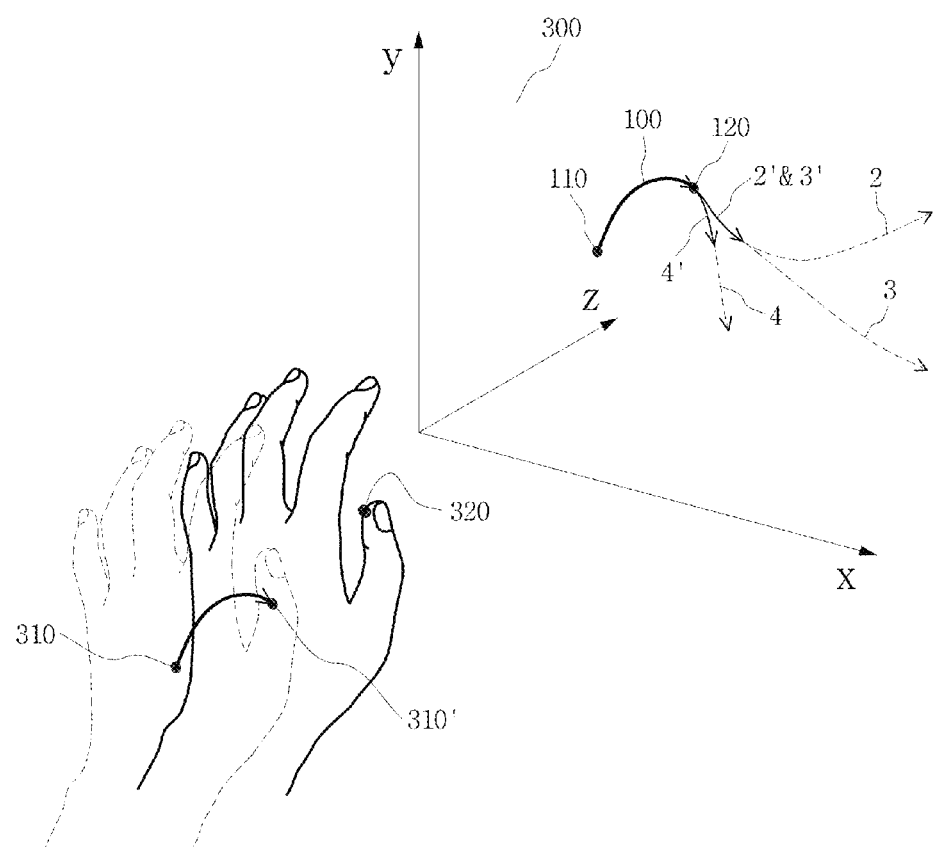
Figure 6:
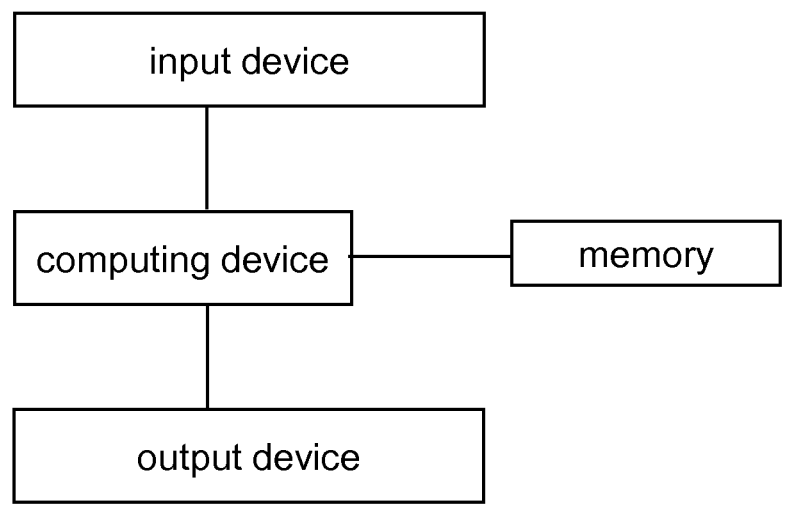
FIG. 6 is a diagram illustrating an example of a system for implementing a user interface.
Figure 7:
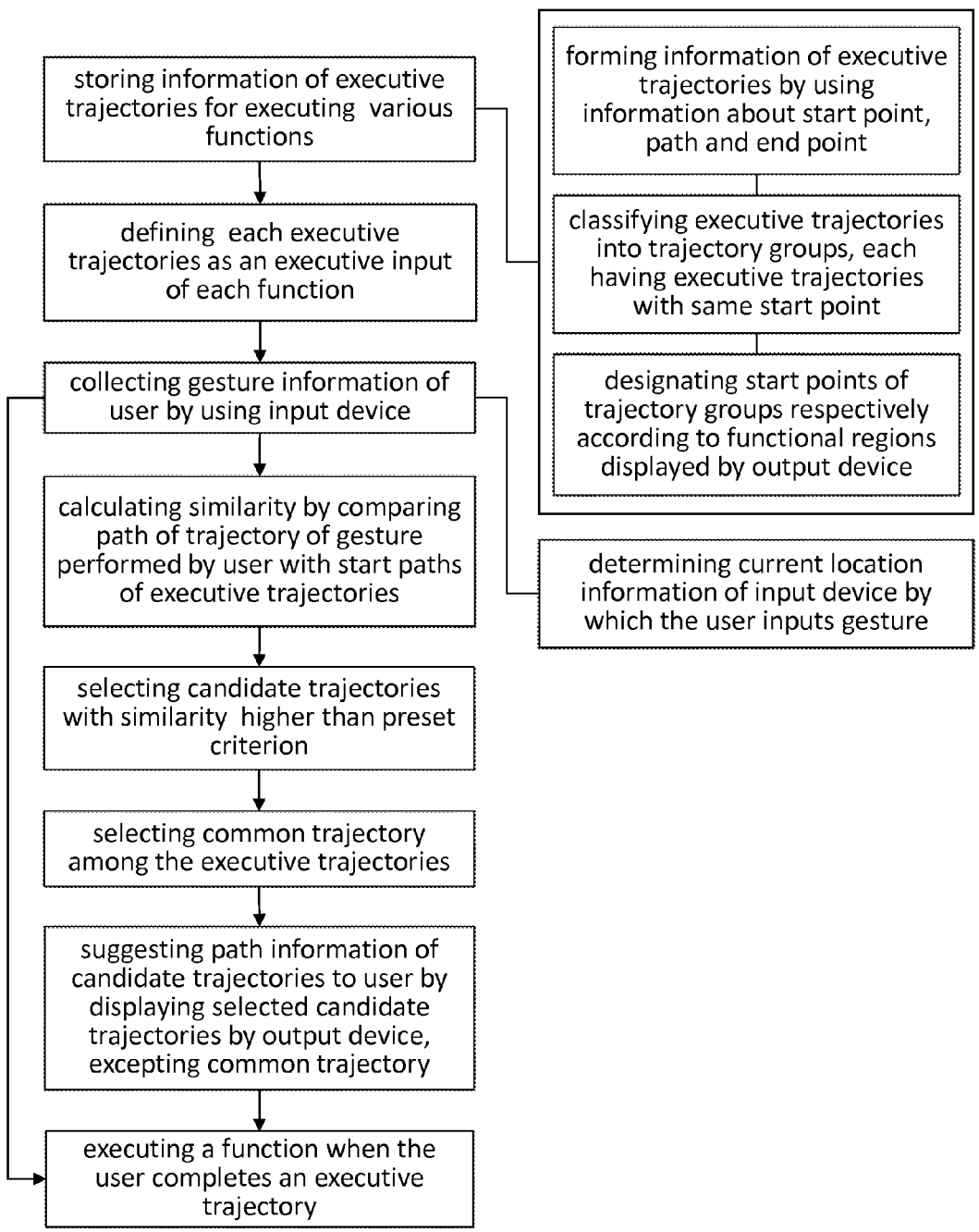
FIG. 7 is a flowchart illustrating an example of a method for implementing a user interface.

FIGS. 4 and 5 are diagrams for illustrating a 3-dimensional system for implementing a user interface according to further another embodiment of the present disclosure.

The system for implementing a user interface according to this embodiment includes an input device (not shown) for collecting information about 3-dimensional gestures made by a user, a computing device for processing the information collected by the input device, and an output device 300 for displaying a 3-dimensional virtual space.

The input device uses, for example, a depth camera for detecting a behavior status of an object for example, hand by using distance information between the camera and the object.

The computing device calculates information and input signals received from the input device. The computing device outputs a 3-dimensional virtual space and various 3-dimensional graphics through the output device as a central processing unit.

Meanwhile, the system for implementing a user interface includes a memory. The memory stores 3-dimensional trajectories, which may be expressed with x-axis, y-axis and z-axis coordinates on the 3-dimensional virtual space.

The output device displays the 3-dimensional virtual space and provides a visible interface to the user. In this embodiment, a monitor 300 for displaying a 3-dimensional virtual space on a 2-dimensional screen is used as the output device.

As shown in FIG. 4, the depth camera detects a location of a point 310 on the hand of the user and matches the point 310 with a point 110 of the 3-dimensional virtual space on the screen. At this time, in order to visually show the location of the point 110 to the user, a cursor may be displayed on the screen.

As shown in FIG. 5, in order to perform a function according to a gesture, the user first makes a hand shape which indicates the initiation of the gesture. For example, a motion of attaching the thumb to the palm may be used for this purpose. If a location of a single point on the hand of the user and a hand shape for indicating the initiation of the gesture are detected by the depth camera, the computing device recognizes this motion as a behavior for fixing the start point of a trajectory of a gesture and recognizes the point 110 corresponding to the point 310 on the hand as a start point of a trajectory of a gesture.

If the user moves the hand as shown in FIG. 5, the depth camera detects the motion of the point 310 on the palm and obtains a trajectory of a gesture 100 where a point corresponding to a current location 310' of the hand is a current point 120. Since the depth camera may detect movements in the z-axis direction as well as in the x-axis and y-axis directions, it will be understood that a trajectory of a gesture 100 is a 3-dimensional trajectory expressed with x-axis, y-axis and z-axis coordinates in the 3-dimensional virtual space.

The computing device compares the 3-dimensional trajectory of a gesture with paths of the executive trajectories by means of the similarity checking process described above, and selects candidate trajectories 2, 3, 4. As shown in FIG. 5, parts 2' & 3', 4' of the selected candidate trajectories 2, 3, 4 are displayed on the monitor 300 to suggest a gesture completing path for executing a function desired by the user.

While the exemplary embodiments have been shown and described, it will be understood by those skilled in the art that various changes in form and details may be made thereto without departing from the spirit and scope of the present disclosure as defined by the appended claims.

What is claimed is:

1. A system for implementing a user interface, comprising:
an input device for collecting gesture information of a user;
a computing device for processing the gesture information collected by the input device;
a memory for storing information of executive trajectories for executing various functions; and
an output device for displaying the information processed by the computing device,
wherein each executive trajectory is defined as an executive input for each function, so that, if a trajectory of a gesture performed by the user completes one of the executive trajectories, a function corresponding to the corresponding executive trajectory is executed,
wherein, if the user starts a gesture, the computing device compares a path of a trajectory of a gesture performed by the user with start paths of the executive trajectories and selects candidate trajectories having similarity higher than a preset criterion, and
wherein the selected candidate trajectories are displayed by the output device to suggest path information of the candidate trajectories to the user.

2. The system for implementing a user interface according to claim 1,
wherein the information of the executive trajectories includes information about a start point, a path and an end point,
wherein the executive trajectories are classified into trajectory groups, each having executive trajectories with the same start point, and
wherein, in the case a start location of a trajectory of a gesture performed by the user corresponds to the start point, the candidate trajectories are selected in a trajectory group having the start point.

3. The system for implementing a user interface according to claim 2, wherein start points of the trajectory groups are respectively designated according to functional regions output from the output device.

4. The system for implementing a user interface according to claim 1,
wherein the computing device determines current location information of an input device by which the user inputs a gesture, and
wherein path information after the start path of the candidate trajectories to be performed by the user is suggested based on the current location of the input device.

5. The system for implementing a user interface according to claim 4, wherein path information after the start path is a part of the candidate trajectories.

6. The system for implementing a user interface according to claim 1,
wherein the executive trajectories include a common trajectory, and
wherein the common trajectory is not displayed by the output device.

7. The system for implementing a user interface according to claim 1,
wherein the input device collects 3-dimensional gesture information of a user,
wherein the output device outputs a 3-dimensional virtual space set by the computing device, and
wherein the executive trajectories are 3-dimensional trajectories expressible in the virtual space.

8. A method for implementing a user interface, comprising:
storing information of executive trajectories for executing various functions;

defining each executive trajectory as an executive input of each function;

collecting gesture information of a user by using an input device;

calculating similarity by comparing a path of a trajectory of a gesture performed by the user with start paths of the executive trajectories, when the user starts a gesture;

selecting candidate trajectories with similarity higher than a preset criterion;

suggesting path information of the candidate trajectories to the user by displaying the selected candidate trajectories by an output device; and when a trajectory of a gesture performed by the user completes one of the executive trajectories, executing a function corresponding to the completed trajectory.

9. The method for implementing a user interface according to claim 8, further comprising:

forming the information of the executive trajectories by using information about a start point, a path and an end point; and classifying the executive trajectories into trajectory groups, each having executive trajectories with the same start point, wherein, in the case a start location of a trajectory of a gesture performed by the user corresponds to the start point, the candidate trajectories are selected in a trajectory group having the start point.

10. The method for implementing a user interface according to claim 9, further comprising:

designating start points of the trajectory groups respectively according to functional regions displayed by the output device.

11. The method for implementing a user interface according to claim 8, further comprising:

determining current location information of an input device by which the user inputs a gesture, wherein path information after the start path of the candidate trajectories to be performed by the user is suggested based on the present location of the input device.

12. The method for implementing a user interface according to claim 11, wherein path information after the start path is a part of the candidate trajectories.

13. The method for implementing a user interface according to claim 8, further comprising:

selecting a common trajectory among the executive trajectories, wherein the common trajectory is not displayed by the output device.

\* \* \* \* \*